(12) United States Patent
Yoo et al.

(10) Patent No.: US 12,711,053 B2
(45) Date of Patent: Aug. 18, 2026

(54) SYSTEM-ON-CHIP FOR SYNCHRONIZING DATA BETWEEN PROCESSORS AND MEMORY SHARING METHOD THEREOF

(71) Applicant: SAMSUNG ELECTRONICS CO., LTD., Suwon-si (KR)

(72) Inventors: Jun Hee Yoo, Suwon-si (KR); Seunghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/894,932

(22) Filed: Sep. 24, 2024

(65) Prior Publication Data

US 2025/0252039 A1 Aug. 7, 2025

(30) Foreign Application Priority Data

Feb. 7, 2024 (KR) ........................ 10-2024-0019075

(51) Int. Cl.
*G06F 12/00* (2006.01)
*G06F 12/02* (2006.01)

(52) U.S. Cl.
CPC ................................ *G06F 12/0223* (2013.01)

(58) Field of Classification Search
CPC ....................................................... G06F 9/544
See application file for complete search history.

(56) References Cited

U.S. PATENT DOCUMENTS 7,650,331 B1 * 1/2010 Dean ....................... G06F 9/544 712/203
7,792,885 B2 9/2010 Piper et al.
8,286,180 B2 10/2012 Foo
9,466,091 B2 10/2016 Clohset et al.
9,703,605 B2 7/2017 Lu et al.
9,864,709 B2 1/2018 Vajapeyam
9,916,257 B2 3/2018 Sankaran et al.
10,515,045 B1 12/2019 Mattina
2005/0120185 A1 6/2005 Yamazaki et al.
2016/0132360 A1 * 5/2016 Raghavan ................. G06F 9/54 718/104

(Continued)

FOREIGN PATENT DOCUMENTS

CN 101861568 A * 10/2010 ............. G06F 9/544

OTHER PUBLICATIONS

Alverson et al., "Tera Hardware Software Cooperation," Proceedings of the 1997 ACM/IEEE Conference on Supercomputing, Nov. 15, 1997, pp. 1-16.

(Continued)

*Primary Examiner* — Shawn X Gu
*Assistant Examiner* — Mohammad S Hasan
(74) *Attorney, Agent, or Firm* — Fish & Richardson P.C.

(57) ABSTRACT

Disclosed is a system-on-chip SoC, comprising, a host configured to generate job launching, a buffer memory, a producer configured to generate data in response to the job launching and store the generated data in the buffer memory, a consumer configured to read and process the data from the buffer memory in response to the job launching, and a HiveSync monitor configured to exchange at least one ready bit with the producer and the consumer indicating a readiness state of the data in the buffer memory, wherein the ready bit indicates the readiness state of the data divided into specific units.

14 Claims, 14 Drawing Sheets

(56) References Cited

U.S. PATENT DOCUMENTS

| | | | | |
|---|---|---|---|---|
| 2018/0293169 | A1* | 10/2018 | Beard | G06F 12/1054 |
| 2020/0364088 | A1 | 11/2020 | Ashwathnarayan et al. | |
| 2024/0199070 | A1* | 6/2024 | Baumgaertner | G06F 9/4887 |
| 2024/0385965 | A1* | 11/2024 | Foley | G06F 9/3826 |

OTHER PUBLICATIONS

Asri et al., "CASPHAr, Cache-Managed Accelerator Staging and Pipelining in Heterogeneous System Architectures," IEEE Transactions on Computer-Aided Design of Integrated Circuits and Systems, Aug. 9, 2022, vol. 41, No. 11, 12 pages.

* cited by examiner

FIG. 2

| Index | valid | tag | ready bits(64-bit) |
|---|---|---|---|
| 0 | 1 | 10 | |
| 1 | 1 | 22 | |
| 2 | 1 | 99 | |
| 3 | 1 | 50 | |
| ⋮ | ⋮ | ⋮ | ⋮ |
| 1022 | 1 | 99 | |
| 1023 | 0 | 50 | |

FIG. 3
HS_PA [36:0]
36
35
0
Physical Address
HS_ATT bit
[36]
B_PA
[35:0]
0: Unrelated to HiveSync
1: Routed to HS monitor

1200 Producer

1300 Consumer

1600 System Interconnetcor

1500 Buffer Memory

64 Byte Buffer d

1400 HiveSync Monitor

1420

| Address | Ready |
| --- | --- |
| 0x_000a_1000 | 0 |
| 0x_000a_1040 | 0 |
| 0x_000a_1080 | 1 |
| 0x_000a_10c0 | 0 |
| 0x_000b_0000 | 0 |
| 0x_000b_0040 | 0 |
| ... | 0 |
| ... | 0 |
| ... | 0 |
| 0x_000b_0000 | 0 |

1000
1200
Producer
1300
Consumer
1600
System Interconnetcor
1500
Buffer Memory
Buffer
d d d
d d d
64B x5
1420
1400
HiveSync Monitor
Address
Ready
0x_000a_1000 0
0x_000a_1040 0
0x_000a_1080 1
0x_000a_10c0 1
0x_000a_10d0 1
0x_000b_1000 1
0x_000b_1040 1
...
...
0x_000b_0000 0

FIG. 7

Start

Issue data write to buffer memory

S110

Issue ready bit wirte to HS_mon

S120

End

FIG. 9

Ready bit (multi-bit)

| Category | Value | Note | Update method |
|---|---|---|---|
| Initial Value | 0 | Data not ready for consumers | Initialize |
| Count | 1, 2, 3, 4 | Number of consumers waiting | Decrease or hold by 1 each time the consumer reads |
| Constant | 5 | Data for consumers has been prepared, but the number of consumer is unknown. | Initialized to 0 by host (or SW) |
| Close | 6, 7 | Consumer data reading completed | discard |

2100 Host

2200 ISP

2300 NPU

2600 NoC

2350 GPU

2400 HiveSync Monitor

2420 Readiness table

2500 Buffer Memory

FIG. 14

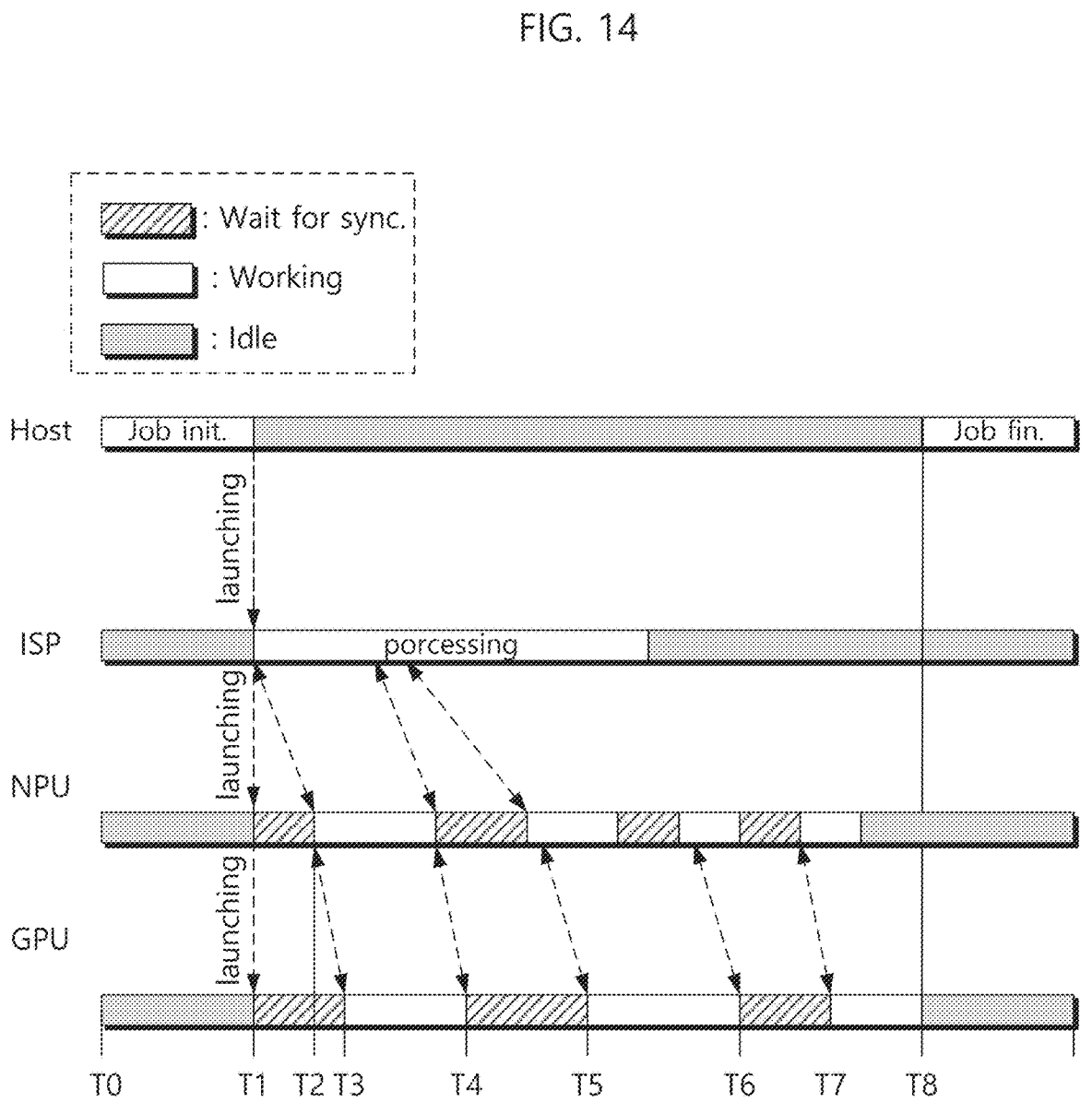

: Wait for sync.
: Working
: Idle

Host
ISP
NPU
GPU

Job init.
Job fin.
launching
launching
launching
porcessing

T0 T1 T2 T3 T4 T5 T6 T7 T8

SYSTEM-ON-CHIP FOR SYNCHRONIZING DATA BETWEEN PROCESSORS AND MEMORY SHARING METHOD THEREOF

CROSS-REFERENCE TO RELATED APPLICATIONS

This application claims priority under 35 U.S.C. § 119 to Korean Patent Application No. 10-2024-0019075 filed in the Korean Intellectual Property Office on Feb. 7, 2024, the entire contents of which are incorporated by reference herein.

BACKGROUND

Recently, artificial intelligence AI functions have been used in various fields. For example, artificial intelligence AI functions are used for various functions such as voice recognition and image classification in various electronic devices such as personal computers, laptops, tablets, smartphones, digital cameras, etc. In addition, with the development of artificial intelligence AI technology, the development of applications using AI is continuously expanding.

In order to apply artificial intelligence AI technology, there is a growing demand to utilize the computational resources of an application processor AP in various ways. In an application processor AP that includes heterogeneous processors, data sharing between different processors is mainly synchronized in buffer units. Therefore, it is impossible to avoid the problems of reduced performance and power efficiency of the application processor AP due to this.

As application functions become more diverse, data generation-consumption patterns between processors are also becoming more diverse. One of these data generation-consumption patterns is a type in which data generated by one producer is consumed by two or more consumers. However, this data generation-consumption pattern must presuppose certain patterns for data writing/reading by producers and consumers, and 1:1 connection in the buffer. Under this premise, there are restrictions on free connection and data sharing between computational resources.

SUMMARY

In general, in some aspects, the present disclosure is directed toward a system-on-chip for synchronizing buffer data between heterogeneous processors and a memory synchronization method thereof.

According to some implementations, the present disclosure is directed to a system-on-chip (SoC) comprising a host configured to generate job launching, a buffer memory, a producer configured to generate data in response to the job launching and store the generated data in the buffer memory, a consumer configured to read and process the data from the buffer memory in response to the job launching, and a HiveSync monitor configured to exchange at least one ready bit with the producer and the consumer indicating a readiness state of the data in the buffer memory, wherein the ready bit indicates the readiness state of the data divided into specific units.

According to some implementations, the present disclosure is directed to a method of synchronizing a buffer memory of system-on-chip (SoC) comprising writing data into the buffer memory by a producer, issuing a request to write a ready bit for the data to the HiveSync monitor by the producer, issuing a read request for the ready bit to the HiveSync monitor by a consumer, and wherein when the ready bit indicates a ready state, the consumer issues a read request for the data to the buffer memory.

According to some implementations, the present disclosure is directed to a system-on-a-chip (SoC) comprising a host generating a job launching, a buffer memory, a first processor configured to generate data in response to the job launching and store the generated data in the buffer memory, a second processor configured to read and process the data from the buffer memory in response to the job launching, a third processor configured to read and process the data from the buffer memory in response to the job launching, a HiveSync monitor configured to exchange ready bit indicating a readiness state of the data in the buffer memory and the first to third processors, and a system interconnector configured to provide a communication channel for each of the host, the buffer memory, the first to third processors, and the HiveSync monitors, wherein the ready bit is allocated as 1 bit per specific size unit of the data stored in the buffer memory.

BRIEF DESCRIPTION OF THE DRAWINGS

Example implementations will be more clearly understood from the following detailed description, taken in conjunction with the accompanying drawings.

FIG. 2 is a block diagram showing an example configuration of the HiveSync monitor of FIG. 1 according to some implementations.

FIG. 4 is a block diagram showing an example of a ready bit writing operation of the HiveSync monitor according to some implementations.

FIG. 7 is a flowchart showing an example of a request a write to a producer's HiveSync monitor according to some implementations.

FIG. 9 is a table showing an example of a structure of a multi-ready bit according to some implementations.

FIG. 11 is a block diagram showing an example of a system-on-chip according to some implementations.

FIG. 14 is a timing diagram showing an example of a host's task launching process when using a HiveSync monitor according to some implementations.

DETAILED DESCRIPTION

Hereinafter, example implementations will be explained in detail with reference to the accompanying drawings. It is to be understood that both the foregoing general description and the following detailed description are exemplary, and it is to be considered that an additional description of the claimed invention is provided. Reference signs are indicated in detail in preferred embodiments of the present invention, examples of which are indicated in the reference drawings. Wherever possible, the same reference numbers are used in the description and drawings to refer to the same or like parts.

Hereinafter, producer will be used to encompass processors, functional block, proprietary asset, and logic blocks that generate data within a system-on-chip SoC and store it in a buffer memory. In addition, consumer refers to processor, functional block, proprietary asset, and logic block that performs subsequent processing using data generated by the producer. In the description of the present disclosure, producer and consumer will be used to refer to producer and consumer of data shared in the buffer memory.

Figure 1:
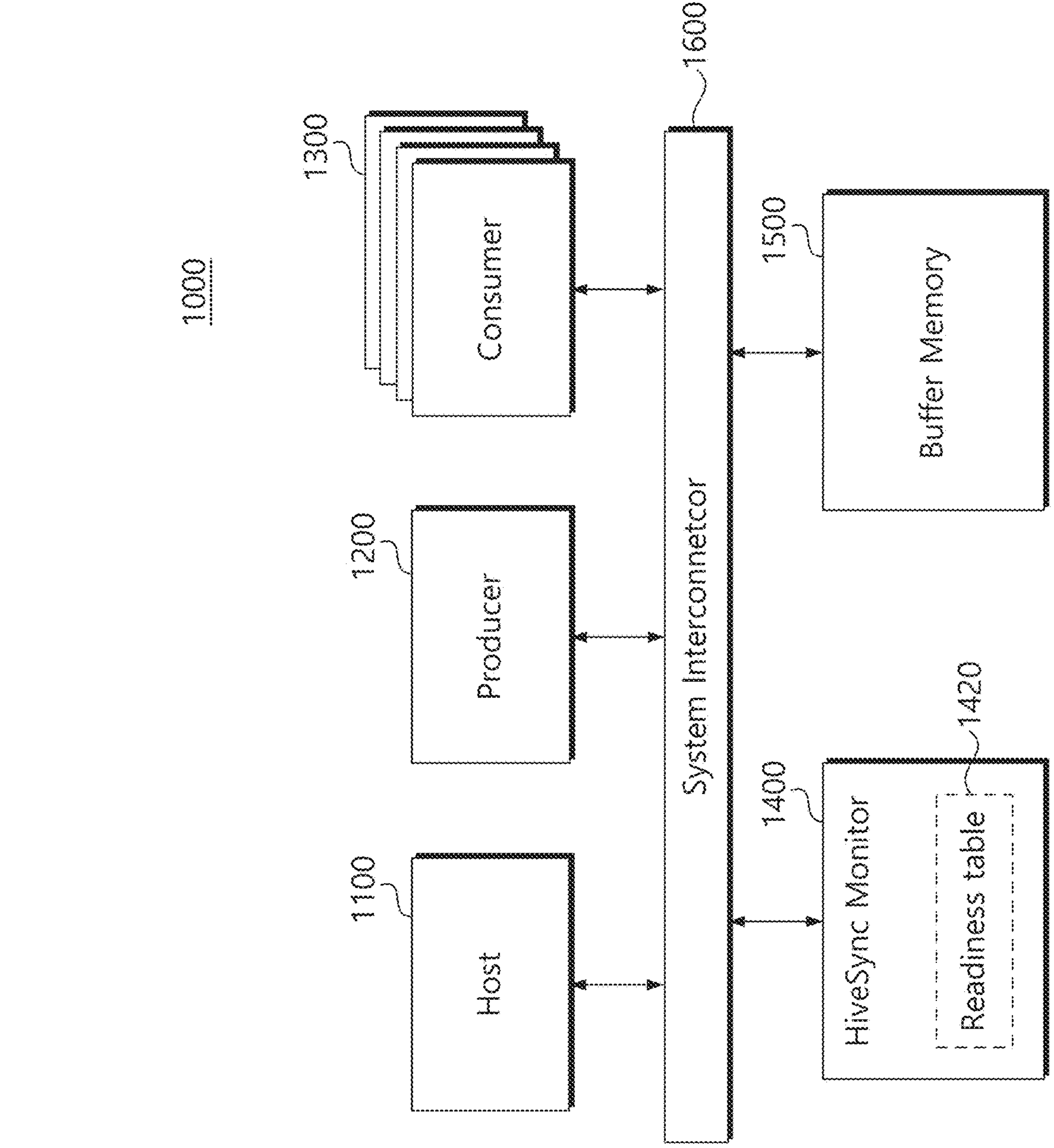
FIG. 1 is a block diagram showing an example of a system-on-chip SoC according to some implementations.

FIG. 1 is a block diagram showing an example of a system-on-chip (SoC) according to some implementations. In FIG. 1, the system-on-chip 1000 may include a host 1100, a producer 1200, a consumer 1300, a HiveSync monitor 1400, a buffer memory 1500, and a system interconnector 1600. Here, the consumer 1300 may include a plurality of processors, functional blocks, or proprietary assets.

The host 1100 performs overall functions to control the system-on-chip 1000. The host 1100 may drive the system-on-chip 1000 by executing programs and/or commands stored in the buffer memory 1500 or a separate operating memory. The host 1100 may be implemented with at least one of a central processing unit CPU, a graphics processing unit GPU, a functional block, proprietary asset, provided in the system-on-chip 1000, but is not limited thereto. In some implementations, the host 1100 may be a processor or software itself that allocates tasks to components, such as the producer 1200 or the consumer 1300, according to the operation of software.

The producer 1200 generates data according to the request of the host 1100 within the system-on-chip 1000 and stores it in the buffer memory 1500. According to scheduling or commands from the host 1100, the producer 1200 will generate data and make a write request to the buffer memory 1500 via the system interconnector 1600. For example, the producer 1200 may be an image signal processor ISP that samples an image and stores the sampled image in the buffer memory 1500, or a functional block or proprietary asset dedicated to image processing.

After writing data to the buffer memory 1500, the producer 1200 writes a ready bit for the address of the buffer memory 1500 where the data is written in the readiness table 1420 of the HiveSync monitor 1400. In some implementations, when data is written to the buffer memory 1500, the ready bit of the corresponding address may be updated by the HiveSync monitor 1400. In this way, the readiness table 1420 that can manage ready bits for all addresses of the buffer memory 1500 can be operated.

The consumer 1300 performs an operation requested by the host 1100 using data stored in the buffer memory 1500 by the producer 1200. The consumer 1300 must read and process data stored in the buffer memory 1500. To this end, the consumer 1300 reads the ready bit of the address from the readiness table 1420 of the HiveSync monitor 1400. And when the ready bit is logic '1', the consumer 1300 can read the corresponding memory area of the buffer memory 1500. On the other hand, when the ready bit is logic '0', the consumer 1300 must wait until the ready bit is converted to logic '1'. The HiveSync monitor 1400 may transmit an interrupt to the consumer 1300 when the ready bit requested by the consumer 1300 to read is toggled to logic '1'. And the consumer 1300 can read the ready bit of the HiveSync monitor 1400 again in response to the interrupt.

Here, at least one of the host 1100, producer 1200, and consumer 1300 include at least one of a central processing unit CPU, graphics processing unit GPU, neural processing unit NPU, tensor processing unit TPU, vision processing unit VPU, image signal processor ISP, and a digital signal processor DSP to perform a specialized operation. The host 1100, producer 1200, and consumer 1300 may be implemented as hardware, software (or firmware), or a combination of hardware and software.

The HiveSync monitor 1400 can subdivide all memory areas of the buffer memory 1500 into fine units and manage each of the subdivided fine units using ready bits. For example, the HiveSync monitor 1400 can map the memory area of the buffer memory 1500 to a ready bit of 1 bit per fine unit of 32-byte or 64-byte. In other words, the HiveSync monitor 1400 divides all memory areas of the buffer memory 1500 into 64-byte units, and can map the status of each 64-byte to a 1-bit ready bit. This mapping of the buffer memory 1500 and ready bits can be managed through the readiness table 1420.

When a request to write data to the buffer memory 1500 is made by the producer 1200, the producer 1200 will also receive a request to write a ready bit to the readiness table 1420 of the HiveSync monitor 1400. And before a read request occurs to the buffer memory 1500, the consumer 1300 first reads the status of the ready bit from the HiveSync monitor 1400. The consumer 1300 may access the buffer memory 1500 or wait until data is ready in the buffer memory 1500 according to the status of the ready bit of the HiveSync monitor 1400.

Ready bit values for all data areas of the buffer memory 1500 may be written and updated in the readiness table 1420. The HiveSync monitor 1400 may write or output the ready bit of the requested address in response to the write request or the read request from the producer 1200 or the consumer 1300. In addition, the HiveSync monitor 1400 can place the consumer 1300 on standby when the ready bit of the address requested to read is logical '0'. And, at the point when the ready bit of the address requested to read is converted to logic '1', an interrupt can be delivered to the consumer 1300 that requested the corresponding ready bit. In response to the interrupt, the consumer 1300 may retry reading the ready bit and read data from the address area of the corresponding buffer memory 1500. The HiveSync monitor 1400 may include SRAM for generating and updating the readiness table 1420 in the form of a cache line. The readiness table 1420 can be managed by load/store in the buffer memory 1500 used as system memory.

Software or data for controlling various components of the host 1100 may be loaded into the buffer memory 1500. Software or data loaded into the buffer memory 1500 is executed or processed by the host 1100, producer 1200, and consumer 1300. Various application programs, including an operating system OS to be run by the host 1100, may be loaded into the buffer memory 1500. In particular, data to be shared by the producer 1200 and the consumer 1300 is loaded into the buffer memory 1500. In the present invention, the status of the shared data area or all data areas of the buffer memory 1500 can be managed in the readiness table 1420 of the HiveSync monitor 1400. In other words, the readiness state of the memory area of the buffer memory 1500 can be monitored and managed using ready bits in fine units (e.g., 64-byte units). Even when multiple consumers 1300 use data, they can access it by referring to the ready bits of the readiness table 1420. Accordingly, pipeline processing is possible in a task in which a plurality of consumers 1300 share data.

The buffer memory 1500 may include, for example, dynamic random access memory DRAM. However, the buffer memory 1500 is not limited to this, and may include volatile memory, such as SRAM (Static Random Access Memory), flash memory, PRAM (Phase change RAM), MRAM (Magnetic RAM), and ReRAM (Resistive RAM).), and non-volatile memory, such as FRAM (Ferroelectrics RAM).

The system interconnector 1600 connects components within the system-on-chip 1000, that is, the host 1100, producer 1200, consumer 1300, HiveSync monitor 1400, and buffer memory 1500. The system interconnector 1600 may be implemented as a Network-on-Chip NoC circuit. The NoC is a scheme of connecting functional blocks by applying general network technology within a semiconductor chip. The system interconnector 1600 may include a router circuit and a switching circuit to provide a transmission path for data or signals between a plurality of processors. In some implementations, the system interconnector 1600 may be implemented as a bus to which a protocol having a predetermined standard bus standard is applied. For example, as a standard bus standard, the Advanced Microcontroller Bus Architecture (AMBA) protocol of ARM (Advanced RISC Machine) may be applied. Bus types of the AMBA protocol may include Advanced High-Performance Bus (AHB), Advanced Peripheral Bus (APB), Advanced extensible Interface (AXI), AXI4, and an AXI Coherency Extensions (ACE). Among the aforementioned bus types, AXI is an interface protocol between functional blocks and provides multiple outstanding address functions and data interleaving functions. In addition, other types of protocols, such as SONICs Inc.'s uNetwork, IBM's CoreConnect, or OCP-IP's Open Core Protocol, may be applied to the system interconnector 1600.

The system-on-chip 1000 may be mounted on an electronic device, for example, a smart phone, a tablet personal computer, a mobile phone, a personal digital assistant PDA, a laptop, or a wearable device, a global positional system GPS device, an e-book terminal, a digital broadcasting terminal, an MP3 player, a digital camera, a wearable computer, etc. For example, the electronic device may be an Internet of Things IoT device or an electric vehicle. The system-on-chip 1000 may be a controller or processor that controls the operation of an electronic device. The system-on-chip 1000 may refer to an application processor AP, a mobile AP, or a control chip.

As described above, the system-on-chip 1000 of the present disclosure includes the HiveSync monitor 1400 that monitors the state of the memory area of the buffer memory 1500 in fine units. Sharing of the buffer memory 1500 between the producer 1200 and the consumer 1300 can be managed in a fine unit by the HiveSync monitor 1400. In particular, when a plurality of consumers 1300 consume data from the buffer memory 1500, it can be processed in a pipeline manner, enabling high processing performance. A producer 1200 and a plurality of consumers 1300 are connected to the system interconnector 1600 and operated by the HiveSync monitor 1400 of the present disclosure. Accordingly, efficient data sharing of the buffer memory 1500 is possible without changing the internal structure of the host 1100, producer 1200, and consumer 1300 or other computational resources.

Figure 2:
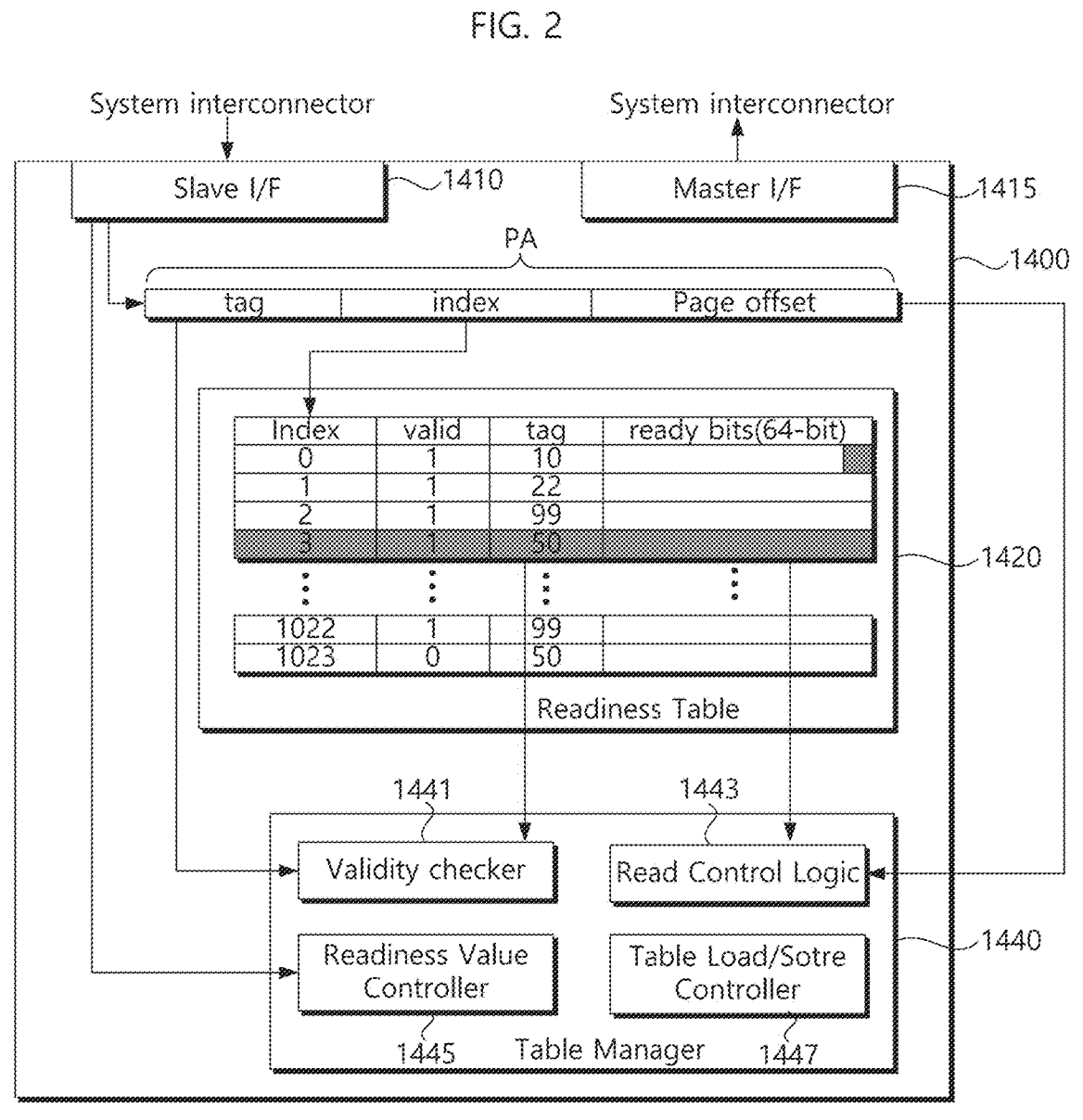

FIG. 2 is a block diagram showing an example configuration of the HiveSync monitor of FIG. 1 according to some implementations. In FIG. 2, the HiveSync monitor 1400 divides the entire physical address PA area of the buffer memory 1500 into fine units, and generates and updates ready bits for each of the fine units. To this end, the HiveSync monitor 1400 may include a readiness table 1420 and a table manager 1440.

The readiness table 1420 may store ready bits in the form of cache lines according to the physical address PA of the buffer memory 1500 to which writing is requested. When data is written to the area corresponding to the physical address PA of the buffer memory 1500 by the producer 1200 (see FIG. 1), data is written to the readiness table 1420 from the producer 1200 or the system interconnector 1600. At this time, the physical address PA where data writing of the buffer memory 1500 occurred may be transmitted through the slave interface 1410 of the HiveSync monitor 1400.

When data is written to the memory area of the buffer memory 1500 corresponding to the physical address PA of index '3' and tag '50', a request to write a ready bit corresponding to the physical address PA will be transmitted from the producer 1200 or the system interconnector 1600 through the slave interface 1410. In response, the table manager 1440 will write the ready bit of index '3' and tag '50' provided in the physical address PA. Here, all ready bits included in the cache line of one readiness table 1420 are shown as 64-bit. That is, one cache line can be allocated to include ready bits in a 4K (64B×64) byte area of the buffer memory 1500.

On the other hand, before reading data into the memory area of the buffer memory 1500 corresponding to the physical address PA of index '3' and tag '50', the ready bit of the corresponding area is checked on the HiveSync monitor 1400. If the consumer 1300 receives a request to read the ready bit of the physical address PA of index '3' and tag '50', table manager 1440 compares the cache lines of the input index '3' and tag '50'. Since there is a tag matching the read requested tag in the selected index, the table manager 1440 determines it as a cache hit. In addition, the valid bit of the cache line at index '3' is '1'. That is, there is no invalid line in the cache line at index '3'. Accordingly, the table manager 1440 can immediately output the ready bit requested by the consumer 1300. If a cache miss occurs, the table manager 1440 will read the data existing in the buffer memory 1500 and transmit it to the consumer 1300.

The table manager 1440 uses a validity checker 1441, a read control logic 1443, a readiness value controller 1445, and a table load/store controller 1447 to manage the above-described readiness table 1420 in the form of a cache line. The validity checker 1441 checks the validity of the cache line by referring to the input physical address PA. The read control logic 1443 may output the value of the ready bit or transmit an interrupt in response to a read request for the ready bit. If the read requested ready bit is still '0', the read control logic 1443 instructs the consumer 1300, which sent the read request, to wait. And when the read requested ready bit is updated to '1', the read control logic 1443 will transmit an interrupt to the consumer 1300 that sent the read request. The readiness value controller 1445 detects the value of the ready bit requested to be written by the producer 1200 from the physical address PA. And the readiness value controller 1445 may write at least one ready bit at the corresponding position among the ready bits of the readiness table 1420 as the value requested to be written. In addition, the readiness value controller 1445 may initialize the ready bit in an invalid state to logic '0' when the consumer's 1300 reading of the ready bit is completed. The table load/store controller 1447 may update the readiness table 1420 managed in the form of a cache line in the buffer memory 1500. In addition, in situations such as a cache miss, the table load/store controller 1447 can read the ready bits of the buffer memory 1500 and perform the function of refilling the corresponding cache line.

Above, the configuration and functions of the HiveSync monitor 1400 according to some implementations were briefly described. However, the management technique using ready bits for shared data of the buffer memory 1500 is not limited to the configuration of the HiveSync monitor 1400 shown. Various ready bit management methods can be implemented by modifying or adjusting based on the above-described technique.

Figure 3:
FIG. 3 is a diagram illustrating example field values of a physical address applied to the system interconnector according to some implementations.

FIG. 3 is a diagram illustrating examples of field values of a physical address applied to the system interconnector according to some implementations. In FIG. 3, the structure of the HiveSync physical address HS_PA for a read or write request to the HiveSync monitor 1400 is shown.

A request to write or read a ready bit to the HiveSync monitor 1400 by the producer 1200 or consumer 1300 is sent to the HiveSync attribute HS_ATT bit in the physical address B_PA of the buffer memory 1500. For example, the HiveSync physical address HS_PA may have a HiveSync attribute HS_ATT bit added to the MSB to the physical address B_PA including a ready bit.

When the HiveSync attribute HS_ATT bit is '0', the corresponding physical address PA represents a physical address that is not a monitoring target of the HiveSync monitor 1400. When a physical address with a HiveSync attribute HS_ATT bit of '0' is received, the HiveSync monitor 1400 may exclude or ignore it from the monitoring target. On the other hand, when the HiveSync attribute HS_ATT bit is '1', the corresponding physical address represents the physical address that is the monitoring target of the HiveSync monitor 1400. The HiveSync monitor 1400 only needs to monitor a physical address where the Hive-Sync attribute HS_ATT bit is '1'.

FIG. 4 is a block diagram showing an example of a ready bit writing operation of the HiveSync monitor according to some implementations. In FIG. 4, the producer 1200 of the system-on-chip 1000 writes 64-byte data to the buffer memory 1500 and then requests the HiveSync monitor 1400 to set the ready bit.

First, the producer 1200 requests to write 64-byte data to the buffer memory 1500. When data writing to the buffer memory 1500 is completed, the producer will subsequently generate a request to set the readiness table 1420 of the HiveSync monitor 1400. The solid arrow passing through the illustrated system interconnector 1600 represents a write request for the buffer memory 1500, and the dotted arrow represents a write request for a ready bit.

The producer 1200 transmits a request to set the readiness table 1420 corresponding to the physical address PA of data written in the buffer memory 1500 to the HiveSync monitor 1400. That is, the producer 1200 requests the HiveSync monitor 1400 to set the ready bit corresponding to the physical address PA of the buffer memory 1500 to logical '1'. Then, the HiveSync monitor 1400 will set the ready bit of the address (0x000a_1080) corresponding to the physical address PA of the buffer memory 1500 to logical '1'. The addresses (0x000a_1000~0x000b_0000) of the HiveSync monitor 1400 must be able to be mapped to the physical addresses of all buffer memories 1500 in 64-byte units.

Figure 5:
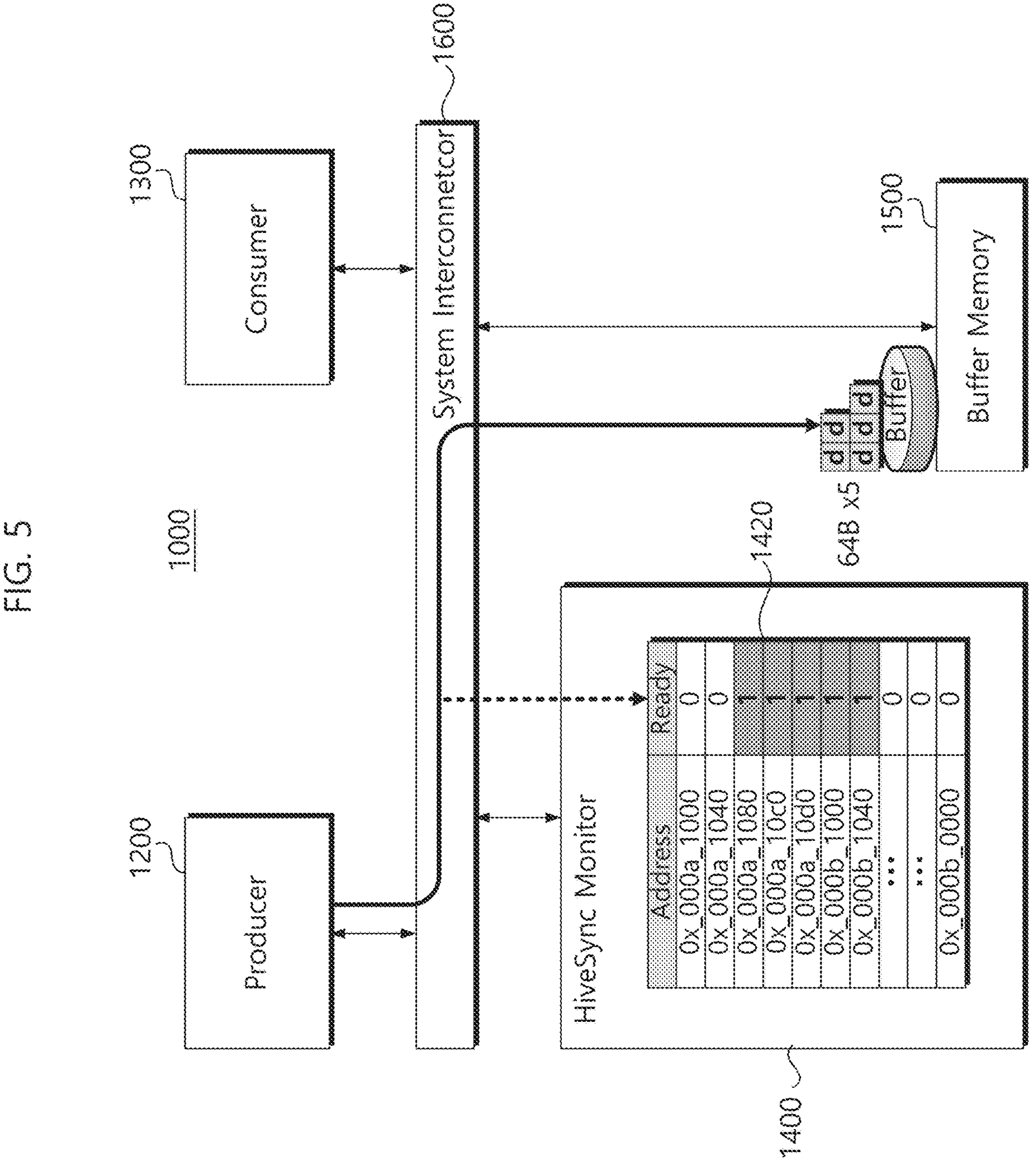
FIG. 5 is a block diagram showing an example of a ready bit write operation of the HiveSync monitor according to some implementations.

FIG. 5 is a block diagram showing an example of a ready bit write operation of the HiveSync monitor according to some implementations. In FIG. 5, the producer 1200 of the system-on-chip 1000 writes a plurality of 64-byte unit data to the buffer memory 1500 and then requests the HiveSync monitor 1400 to set a plurality of ready bits.

The producer 1200 requests to write a plurality of 64-byte data to the buffer memory 1500. When data writing to the buffer memory 1500 is completed, the producer 1200 will subsequently generate a request to set the readiness table 1420 of the HiveSync monitor 1400. The solid arrow passing through the illustrated system interconnector 1600 represents a write request for the buffer memory 1500, and the dotted arrow represents a write request for a ready bit.

The producer 1200 transmits a request to set the readiness table 1420 corresponding to the physical address PA of data written in the buffer memory 1500 to the HiveSync monitor 1400. That is, the producer 1200 requests the HiveSync monitor 1400 to set the ready bit corresponding to the physical address PA of the buffer memory 1500 to logical '1'. In some implementations, the data written by the producer 1200 to the buffer memory 1500 is 5 units of 64-byte data (64B×5). In this case, the producer 1200 will transmit a request to write a ready bit corresponding to the physical address PA of 5 units of 64-byte data (64B×5) to the HiveSync monitor 1400.

The HiveSync monitor 1400 will set all ready bits corresponding to the physical addresses (0x000a_1080, 0x000a_10c0, 0x000a_10d0, 0x000b_1000, 0x000b_1040) of the buffer memory 1500 to logic '1' in response to the ready bit write request from the producer 1200.

Figure 6:
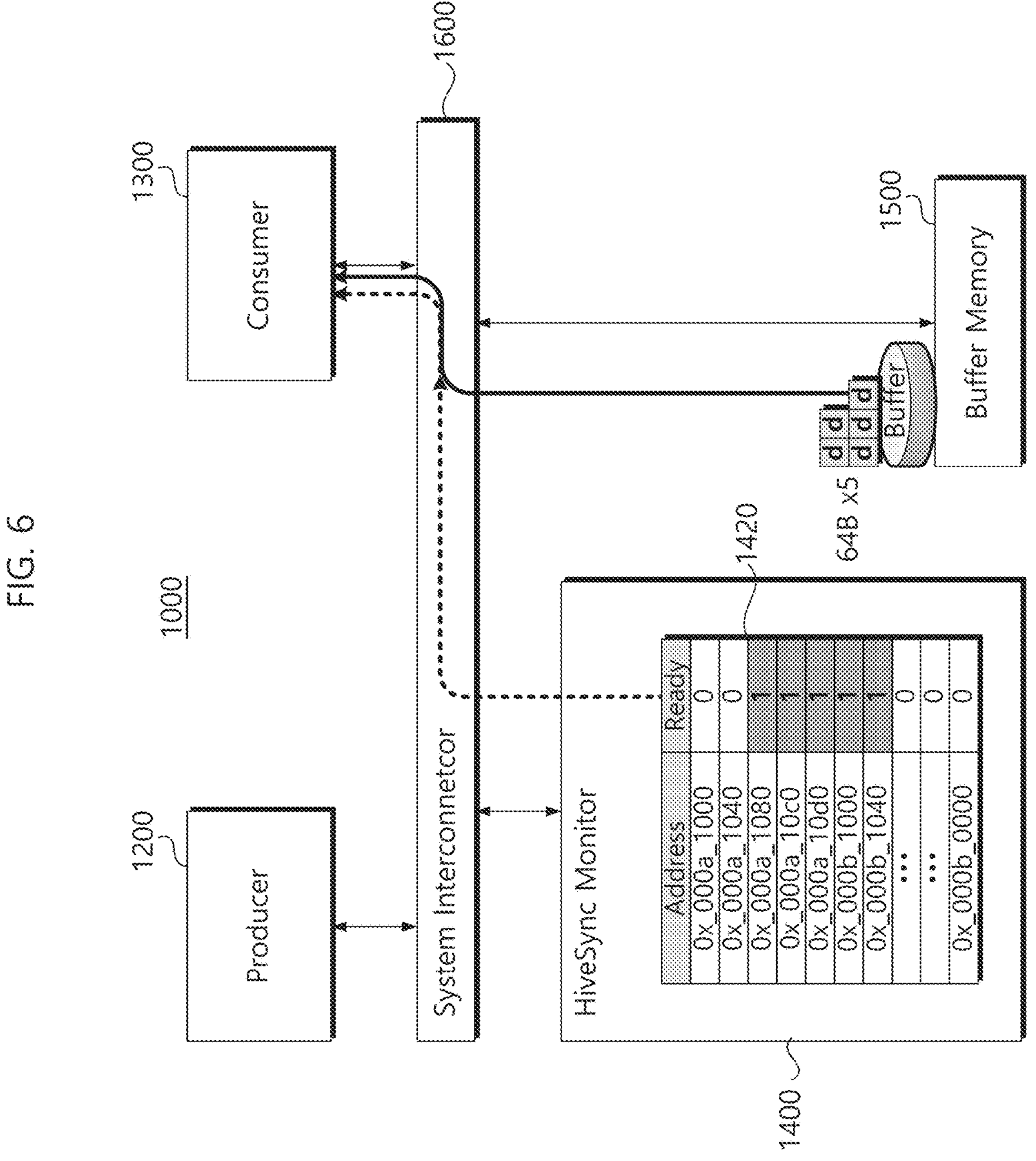
FIG. 6 is a block diagram showing an example of a ready bit read operation of the HiveSync monitor according to some implementations.

FIG. 6 is a block diagram showing an example of a ready bit read operation of the HiveSync monitor according to some implementations. In FIG. 6, the consumer 1300 of the system-on-chip 1000 first accesses the HiveSync monitor 1400 to read a plurality of 64-byte data in the buffer memory 1500 to check the status of a plurality of ready bits.

The consumer 1300 schedules reading of a plurality of 64-byte data stored in the buffer memory 1500 according to a command of the host 1100. First, before reading a plurality of 64-byte data, the consumer 1300 accesses the readiness table 1420 of the HiveSync monitor 1400. That is, the consumer 1300 will transmit a read request for ready bits to the HiveSync monitor 1400 to check the ready bits of a plurality of 64-byte data. The consumer 1300 will access the buffer memory 1500 according to the values of ready bits provided by the HiveSync monitor 1400.

When all ready bits corresponding to the addresses (0x000a_1080, 0x000a_10c0, 0x000a_10d0, 0x000b_1000, 0x000b_1040) from the HiveSync monitor 1400 are checked as logic '1', the consumer 1300 transmits a read request to the buffer memory 1500. On the other hand, if any of the ready bits corresponding to the addresses (0x000a_1080, 0x000a_10c0, 0x000a_10d0, 0x000b_1000, 0x000b_1040) from the HiveSync monitor 1400 are logic '0', the consumer 1300 stops issuing a read request to the buffer memory 1500. And the consumer 1300 waits for an interrupt from the HiveSync monitor 1400. The HiveSync monitor 1400 transmits an interrupt to the consumer 1300 when all ready bits corresponding to the addresses (0x000a_1080, 0x000a_10c0, 0x000a_10d0, 0x000b_1000, 0x000b_1040) are updated to logic '1'. Then, the consumer 1300 transmits a read request for ready bits corresponding to the addresses (0x000a_1080, 0x000a_10c0, 0x000a_10d0, 0x000b_1000, 0x000b_1040) from the HiveSync monitor 1400. At this time, if all ready bits are checked to logic '1', the consumer 1300 will transmit a read request to the buffer memory 1500.

Figure 7:
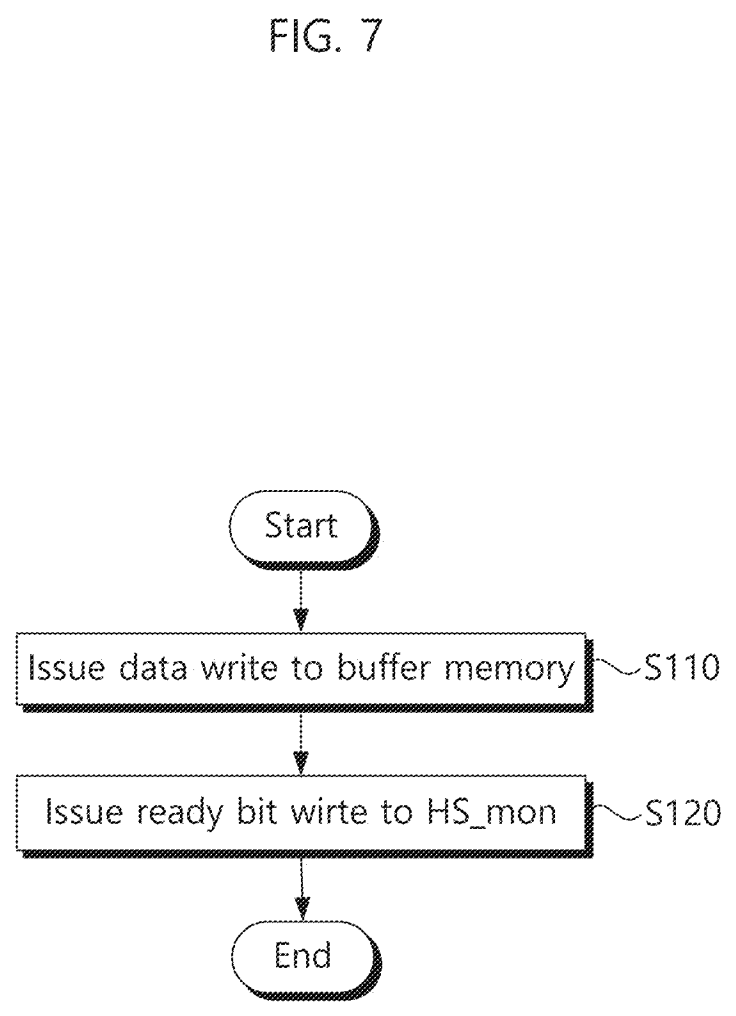

FIG. 7 is a flowchart showing an example of a request a write to a producer's HiveSync monitor according to some implementations. In FIG. 7, the producer (1200, see FIG. 4) issues a data write request to the buffer memory 1500 for synchronization of shared memory with the consumer (1300, see FIG. 4) and then a ready bit write request to the HiveSync monitor 1400.

In step S110, the producer 1200 generates data according to a command or scheduling of the host 1100 and issues a data write request to write the generated data to the buffer memory 1500. For example, the producer 1200 may request to write 64-byte data to the buffer memory 1500.

In step S120, when writing data in 64-byte units to the buffer memory 1500 is completed, the producer 1200 requests the HiveSync monitor 1400 to write a ready bit. In order to request the writing of a ready bit, the producer 1200 sends a setting request to the readiness table 1420 corresponding to the physical address PA of the data written in the buffer memory 1500 to the HiveSync monitor 1400. For example, the producer 1200 requests the HiveSync monitor 1400 to set the ready bit of the corresponding physical address to logical '1' using the HiveSync physical address (HS_PA, see FIG. 3) including the HiveSync attribute (HS_ATT, see FIG. 3) bits of the buffer memory 1500. Then, the HiveSync monitor 1400 sets the ready bit in 64-byte units corresponding to the physical address PA of the buffer memory 1500 to '1' on the readiness table 1420. When the setting of the readiness table 1420 by the HiveSync monitor 1400 is completed, the ready bit write request of the producer 1200 is completed.

In the above, the process of writing data to the buffer memory 1500 of the producer 1200 and requesting writing attribute bits to the HiveSync monitor 1400 has been described. Here, a request to write the attribute bit to the HiveSync monitor 1400 may be automatically issued by the system interconnector 1600. For example, when the HiveSync attribute HS_ATT bit is '1' according to the HiveSync physical address (HS_PA) described in FIG. 3, the attribute bit write request is sent to the HiveSync monitor 1400 at the same time as the write request to the buffer memory 1500. On the other hand, when the HiveSync attribute HS_ATT bit of the HiveSync physical address HS_PA is '0', the system interconnector 1600 may skip transmitting an attribute bit write request to the HiveSync monitor 1400 even if a write request to the buffer memory 1500 occurs.

Figure 8:
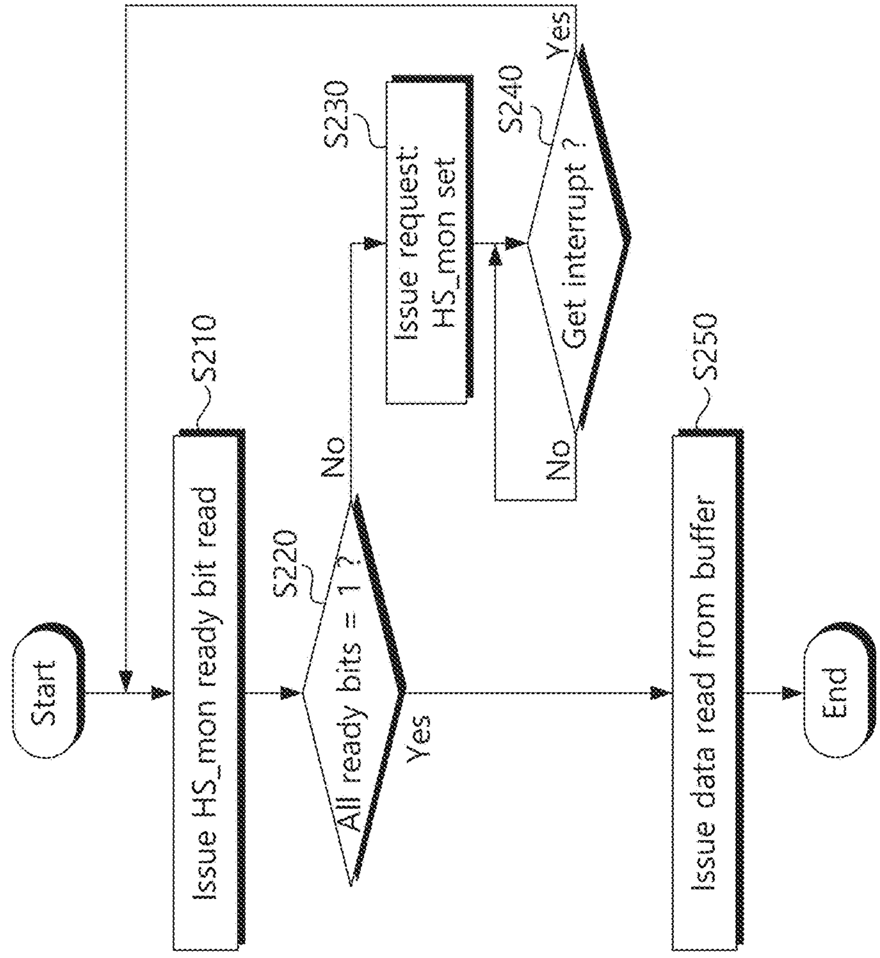
FIG. 8 is a flowchart showing an example of a procedure for reading attribute bits and reading data by a consumer according to some implementations.

FIG. 8 is a flowchart showing an example of a procedure for reading attribute bits and reading data by a consumer according to some implementations. In FIG. 8, the consumer 1300 (see FIG. 6) checks the ready bit from the HiveSync monitor 1400 and then issues a read request to the buffer memory 1500 according to the value of the ready bit.

In step S210, the consumer 1300 transmits a ready bit read request to the HiveSync monitor 1400 to check the ready bits of data stored in the buffer memory 1500. Then, the HiveSync monitor 1400 will output a ready bit corresponding to the physical address PA of the data stored in the buffer memory 1500 of the readiness table 1420 to the consumer 1300. Here, it is assumed that the ready bits are output as 64-bits consisting of ready bits for data in units of 4K bytes. That is, when ready bits requested to be read constitute one cache line, they can be output in 64-bit units.

In step S220, the consumer 1300 checks the status of ready bits output from the HiveSync monitor 1400. For example, the consumer 1300 determines whether all ready bits are logic '1'. In this case, it means that 4K-bytes of data to be written to the buffer memory 1500 by the producer 1200 have been written. If all ready bits are logic '1' ('Yes' direction), the procedure moves to step S250. On the other hand, if logic '0' exists in any one of the ready bits ('No' direction), the procedure moves to step S230.

In step S230, the consumer 1300 requests whether to set ready bits to HiveSync monitor 1400. That is, the consumer 1300 can request an interrupt when all ready bits are set to logic '1'.

In step S240, the consumer 1300 monitors interrupt transmission from the HiveSync monitor 1400. If the interrupt from the HiveSync monitor 1400 is transmitted ('Yes' direction), the procedure moves to step S210 and begins an operation to read the ready bit. On the other hand, if the interrupt transmission from the HiveSync monitor 1400 is not detected ('No' direction), the consumer 1300 will continuously monitor the occurrence of interrupts.

In step S250, the consumer 1300 transmits a read request to the buffer memory 1500 to read data (e.g., 4 KB size) corresponding to 64-bit ready bits. Then, the buffer memory 1500 will sense data at the indicated physical address in response to the read request and output it to the consumer 1300.

Here, a method of using an interrupt to wait for the consumer 1300 to complete setting of the ready bit of the HiveSync monitor 1400 has been described, but the present disclosure is not limited thereto. That is, at the point when all ready bits are set to logic '1', status information can be delivered to the consumer 1300 using various control signals or flags.

FIG. 9 is a table showing an example of a structure of a multi-ready bit according to some implementations. In FIG. 9, the ready bit can also be implemented in the form of a multi-bit that can contain a lot of information, rather than in the form of a single bit flag. Here, the case where the ready bit is configured with a 3-bit size will be described as an example. Accordingly, the value of the multi-ready bit may be '0' to '7'.

If the value of the multi-ready bit is the initial value '0', it indicates that data is not yet ready at the address of the corresponding buffer memory 1500. In other words, a state in which the ready bit is '0' indicates that the corresponding area is in an initialized state before the data writing request or before the data writing is completed. After all the data in the address area is consumed and no more valid data exists, the value of the multi-ready bit may be initialized to '0'.

If the value of the multi-ready bit has counts (1, 2, 3, 4), data writing to the address area of the corresponding buffer memory 1500 is completed, and the specified number of consumers can read it. The value of the multi-ready bit counts down by 1 each time the specified consumers read the address area from the initially set value. For example, 'the value of the multi-ready bit is initially set to '4'. That is, the count value is set to the number of consumers specified by the producer 1200 of the data stored in the corresponding area. Accordingly, there are four consumers waiting to read data from the corresponding address area. Each time each consumer reads data from the corresponding area, the value of the multi-ready bit is deducted by 1. Here, when deducting each count value, the consumer can request to deduct the count value only when it is the last read for the allocated area. In other words, even if one consumer attempts to read the corresponding area multiple times, the count value can be deducted only in the final read operation.

When the value of the multi-ready bit is '5', data writing to the buffer memory 1500 has been completed, but the number of waiting consumers is unknown. Accordingly, after a read request occurs and the corresponding area of the buffer memory 1500 is read, it may be initialized by a request from software or the host 1100.

When the value of the multi-ready bit is '6' and '7', it corresponds to values for cache operation of the multi-ready bit. If the number of consumers 1300 designated by the producer 1200 have all read data, that is, when the final read occurs while the corresponding multi-ready bit is '1', the data in the corresponding buffer memory 1500 should no longer be used. Accordingly, discarding of the corresponding cache line of the readiness table 1420 must begin. Likewise, even when the number of consumers is unknown, when data is read, discarding of the corresponding cache line of the readiness table 1420 must be started. The value of the multi-ready bit that specifies the discard target of such data may be set to '6'. If a read request occurs when the value of the multi-ready bit is '6', it must be treated as an error. When all discarding of the data is complete, the value of the multi-ready bit changes to '7'. When the value of the multi-ready bit is '7', it indicates that reuse is possible after initialization.

Figure 10:
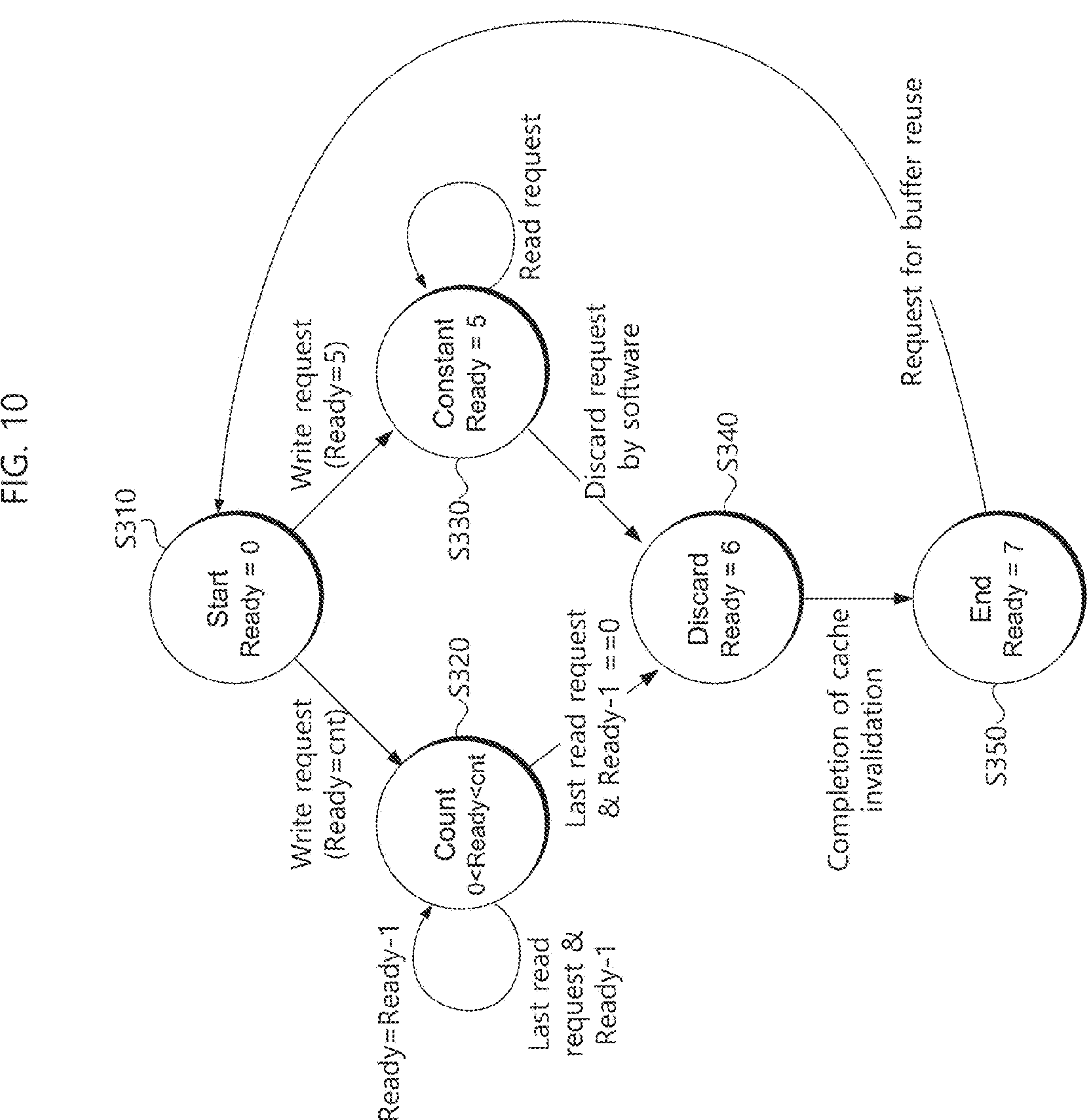
FIG. 10 shows a state machine showing examples of operating characteristics according to the state of the multi-ready bit shown in the table of FIG. 9 according to some implementations.

FIG. 10 shows a state machine showing examples of operating characteristics according to the state of the multi-ready bit shown in the table of FIG. 9 according to some implementations. In FIG. 10, the value of the multi-ready bit set in the readiness table 1420 is changed to the next state by various write requests or read requests.

In the start state S310, the value of the multi-ready bit will be initialized to '0'. In this state, a write request for two multi-ready bits can be provided. For example, when the value of the multi-ready bit is requested to be written as one of the count values (cnt=1, 2, 3, 4), the state transitions to the count state S320. On the other hand, when the value of the multi-ready bit is requested to be written as a constant value of '5', the state transitions to the constant state S330.

In the count state S320, the value of the multi-ready bit is subtracted by 1 from the initial count value according to a read request from at least one consumer 1300. For example, let's assume that the number of consumers specified by the producer 1200 is initially '4'. Each time each consumer reads data from the corresponding area, the value of the multi-ready bit is deducted by 1 (Ready=Ready−1). Here, when subtracting each count value, the consumer 1300 can request subtraction of the count value only when it is the last read for the allocated area. And when the final subtracted count value (Ready−1) becomes '0', the state moves to the discard state S340 for discarding the cache line.

When a read request occurs in a constant state S330 in which the value of the multi-ready bit corresponds to '5', after the corresponding area of the buffer memory 1500 is read, the state moves to the discard state S340 at the request of software or the host 1100.

In the discard state S340 where the value of the multi-ready bit is '6', discarding of the corresponding cache line of the readiness table 1420 begins. When the discard operation of the cache line is completed, the value of the multi-ready bit changes to '7' and the state moves to the end state S350. When a reuse request for the buffer memory 1500 occurs in the end state S350, the value of the multi-ready bit is initialized to '0', and the state moves to the start state S310.

Figure 11:
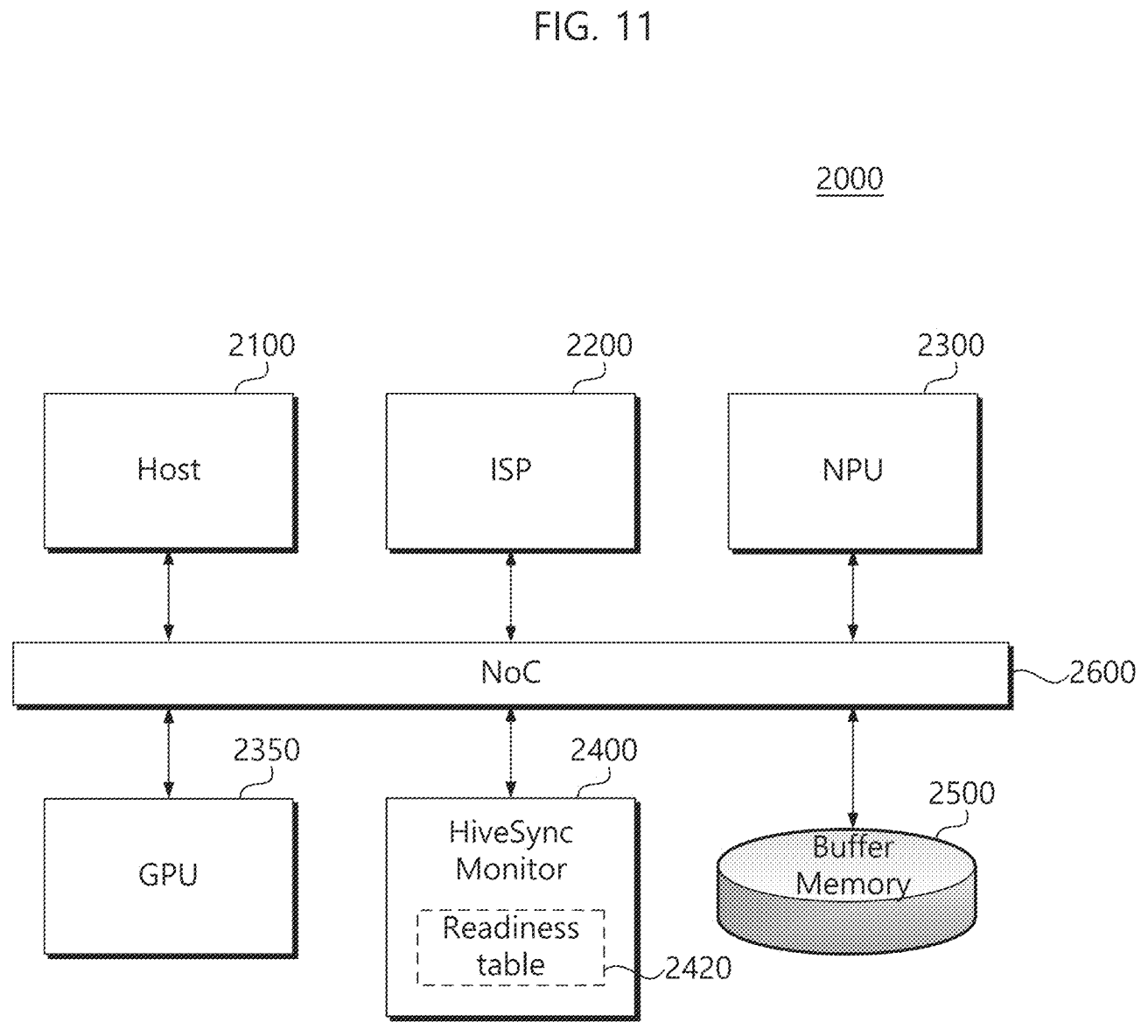

FIG. 11 is a block diagram showing an example of a system-on-chip according to some implementations. In FIG. 11, the system-on-chip 2000 includes a host 2100, an image signal processor ISP 2200, a network processing unit NPU 2300, a graphics processing unit GPU 2350, and a HiveSync monitor 2400, buffer memory 2500, and network-on-chip NoC 2600.

The host 2100 performs overall functions to control the system-on-chip 2000. The host 2100 may control the operation of the system-on-chip 2000 by executing programs and/or instructions stored in the buffer memory 2500 or a separate operating memory. The host 2100 may be implemented with a central processing unit CPU or a specific functional block (e.g., IP) provided in the system-on-chip 2000, but is not limited thereto. In some implementations, the host 2100 may be a processor that allocates tasks to components, such as the ISP 2200, NPU 2300, and GPU 2350, according to the operation of software or the software itself running on the processor. In particular, the host 2100 of the present invention can be launched simultaneously on the ISP 2200, NPU 2300, and GPU 2350 rather than sequentially in order to perform tasks such as image analysis. In this case, data stored in the buffer memory 1500 by the ISP 2200 can be accessed and processed by the NPU 2300 and GPU 2350 in a pipeline manner.

The ISP 2200 processes image data according to the request of the host 1100 and stores it in the buffer memory 1500. For example, the ISP 2200 may be an image processing processor that obtains a video stream from an image signal provided from an image sensor, sub-samples the video stream in specific frame units, and converts it into a target pixel format. Additionally, the ISP 2200 can scale the target pixel format to a frame size that can be processed by the NPU 2300 or GPU and store it in the buffer memory 2500.

The NPU 2300 can read and process data processed by the ISP 2200 and stored in the buffer memory 1500. For example, the NPU 2300 may perform image analysis or recognition operations such as deep neural network DNN or convolutional neural network CNN. To this end, the NPU 2300 may read and process some data written by the ISP 2200 in the buffer memory 1500. That is, the NPU 2300 may read and process a specific data unit for which the ready bit of the HiveSync monitor 2400 is '1'. The NPU 2300 may store the processed data back in the buffer memory 1500 and update the ready bit of the HiveSync monitor 2400 to '1'.

The GPU 2350 can read and process data processed by the NPU 2300 and stored in the buffer memory 1500. For example, the GPU 2350 may read and process some data written by the NPU 2300 in the buffer memory 1500. That is, the GPU 2350 may read and process a specific data unit for which the ready bit of the HiveSync monitor 2400 is '1'.

The HiveSync monitor 2400 can manage ready bits for all memory areas of the buffer memory 2500. For example, the HiveSync monitor 2400 can manage 1-bit ready bit per 64-byte memory address of the buffer memory 2500. That is, the HiveSync monitor 2400 divides all memory areas shared by the ISP 2200, NPU 2300, and GPU 2350 in the buffer memory 2500 into 64-byte units and may map the state of each 64-byte to a 1-bit ready bit. This mapping of the buffer memory 2500 and ready bits can be managed by the readiness table 2420.

Ready bit values for all data areas of the buffer memory 2500 may be written and updated in the readiness table 2420. The HiveSync monitor 2400 may write or output a ready bit of the requested address in response to a write or read request from any one of the ISP 2200, NPU 2300, and GPU 2350. In addition, the HiveSync monitor 2400 can make the consumer (either 2200, 2300, or 2400) that sent the read request wait if the ready bit of the address requested to read is logical '0'. And, at the point when the ready bit of the address requested to read is converted to logic '1', an interrupt can be delivered to the consumer who requested the ready bit. In response to the interrupt, the consumer may retry reading the ready bit and read data from the address area of the corresponding buffer memory 2500. The HiveSync monitor 2400 may include SRAM for generating and updating the readiness table 2420 in the form of a cache line.

Software or data for controlling various components of the host 2100 may be loaded into the buffer memory 2500. Software or data loaded into the buffer memory 2500 is executed or processed by the host 2100, ISP 2200, NPU 2300, and GPU 2350. Various application programs, including an operating system OS to be run by the host 2100, may be loaded into the buffer memory 2500. In particular, data to be shared by the ISP 2200, NPU 2300, and GPU 2350 are loaded into the buffer memory 2500. In the present disclosure, the status of the shared data area or all data areas of the buffer memory 2500 can be managed in the readiness table 2420 of the HiveSync monitor 2400. That is, the readiness state of the memory area of the buffer memory 2500 can be monitored and managed by the HiveSync monitor 2400 in specific units (e.g., 64-byte units). Accordingly, even when multiple consumers use data, they can access it by referring to the ready bits of the readiness table 2420. Accordingly, pipeline processing is possible for specific tasks.

The buffer memory 2500 may include, for example, dynamic random access memory DRAM. However, the buffer memory 2500 is not limited to this, and may include volatile memory, such as static random access memory SRAM, flash memory, phase change RAM PRAM, magnetic RAM MRAM, and resistive RAM ReRAM, and non-volatile memory, such as ferroelectrics RAM FRAM.

NoC 2600 is connected between components within the system-on-chip 2000, that is, host 2100, ISP 2200, NPU 2300, GPU 2350, HiveSync monitor 2400, and buffer memory 2500. The NoC 2600 may include a router circuit and a switching circuit to provide a transmission path for data or signals between a plurality of processors. In some implementations, the NoC 2600 may be implemented as a bus to which a protocol having a predetermined standard bus standard is applied. For example, as the bus standard, the Advanced Microcontroller Bus Architecture (AMBA) protocol of ARM (Advanced RISC Machine) may be applied. Bus types of the AMBA protocol may include Advanced High-Performance Bus (AHB), Advanced Peripheral Bus (APB), Advanced extensible Interface (AXI), AXI4, and AXI Coherency Extensions (ACE). Among the aforementioned bus types, AXI is an interface protocol between functional blocks and provides multiple outstanding address functions and data interleaving functions. In addition, other types of protocols, such as SONICs Inc.'s uNetwork, IBM's CoreConnect, and OCP-IP's Open Core Protocol, may be applied to the NoC 2600.

As described above, the system-on-chip 2000 of the present disclosure includes a HiveSync monitor 2400 that monitors the state of the memory area of the buffer memory 2500 in fine memory units. Data consumed by a plurality of consumers can be efficiently shared by the HiveSync monitor 2400. In particular, when multiple consumers consume data in the buffer memory 2500, processing can be done in a pipeline manner, enabling high processing performance.

Figure 12:
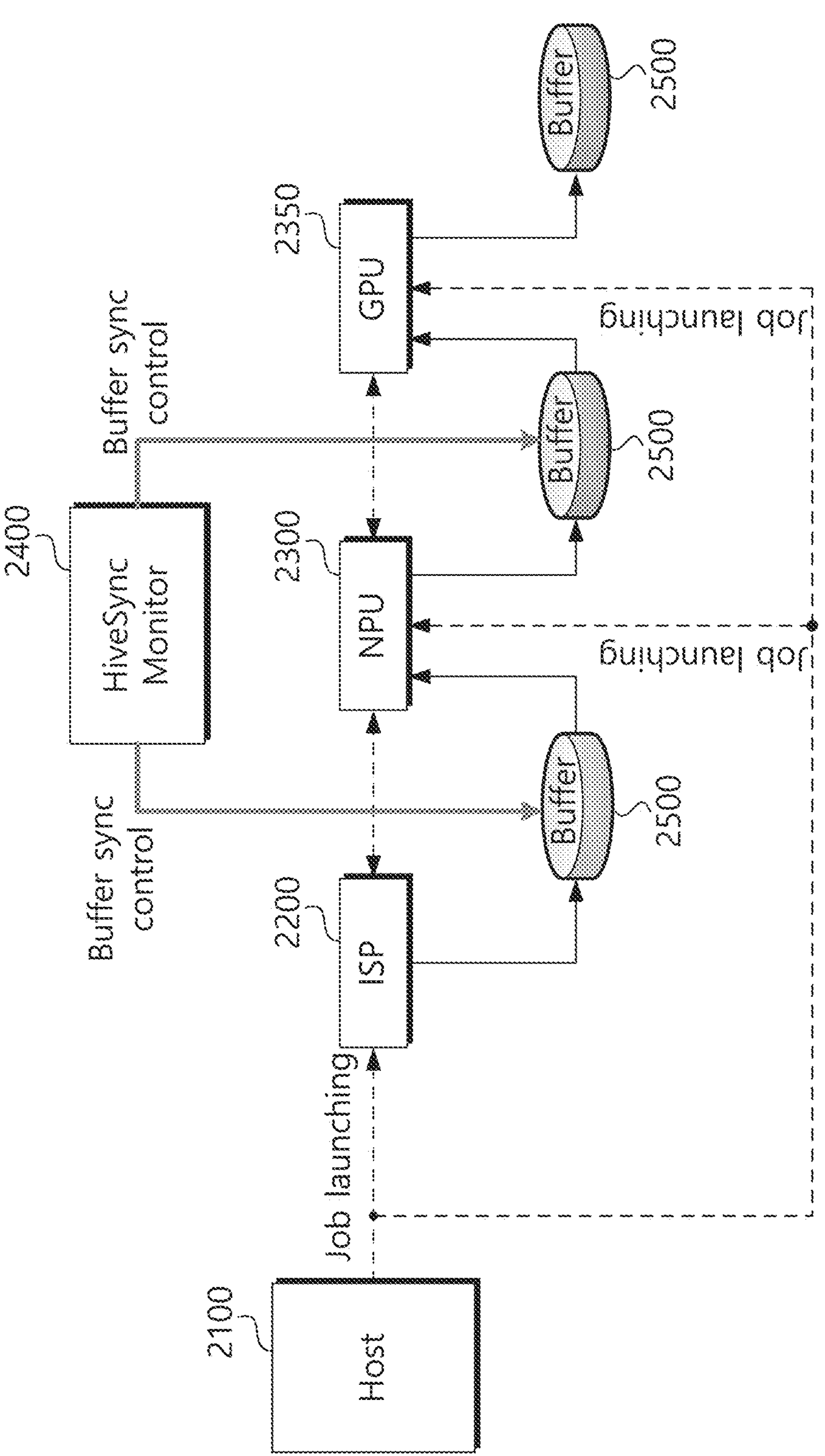
FIG. 12 is a block diagram schematically showing an example of a buffer synchronization method using the HiveSync monitor described in FIG. 11 according to some implementations.

FIG. 12 is a block diagram schematically showing an example of a buffer synchronization method using the HiveSync monitor described in FIG. 11 according to some implementations. In FIG. 12, job launching may be simultaneously transmitted by the host 2100 to the ISP 2200, NPU 2300, and GPU 2350. In addition, the ISP (2200), NPU (2300), and GPU (2350) can each share data in the buffer memory (2500) in fine units using the HiveSync monitor (2400), allowing parallel or pipeline processing.

The ISP 2200, NPU 2300, and GPU 2350 each write or read data to the buffer memory 2500 in response to job launching by the host 2100. After writing data to the buffer memory 2500, the ISP 2200 sets the ready bit managed by the HiveSync monitor 2400. Then, since the HiveSync monitor 2400 manages the ready bits in a fine unit, consumers, such as the NPU 2300 or GPU 2350, can read and process only the amount prepared in the buffer memory 2500. The HiveSync monitor 2400 can provide hardware support such as updating or setting of ready bits.

Figure 13:
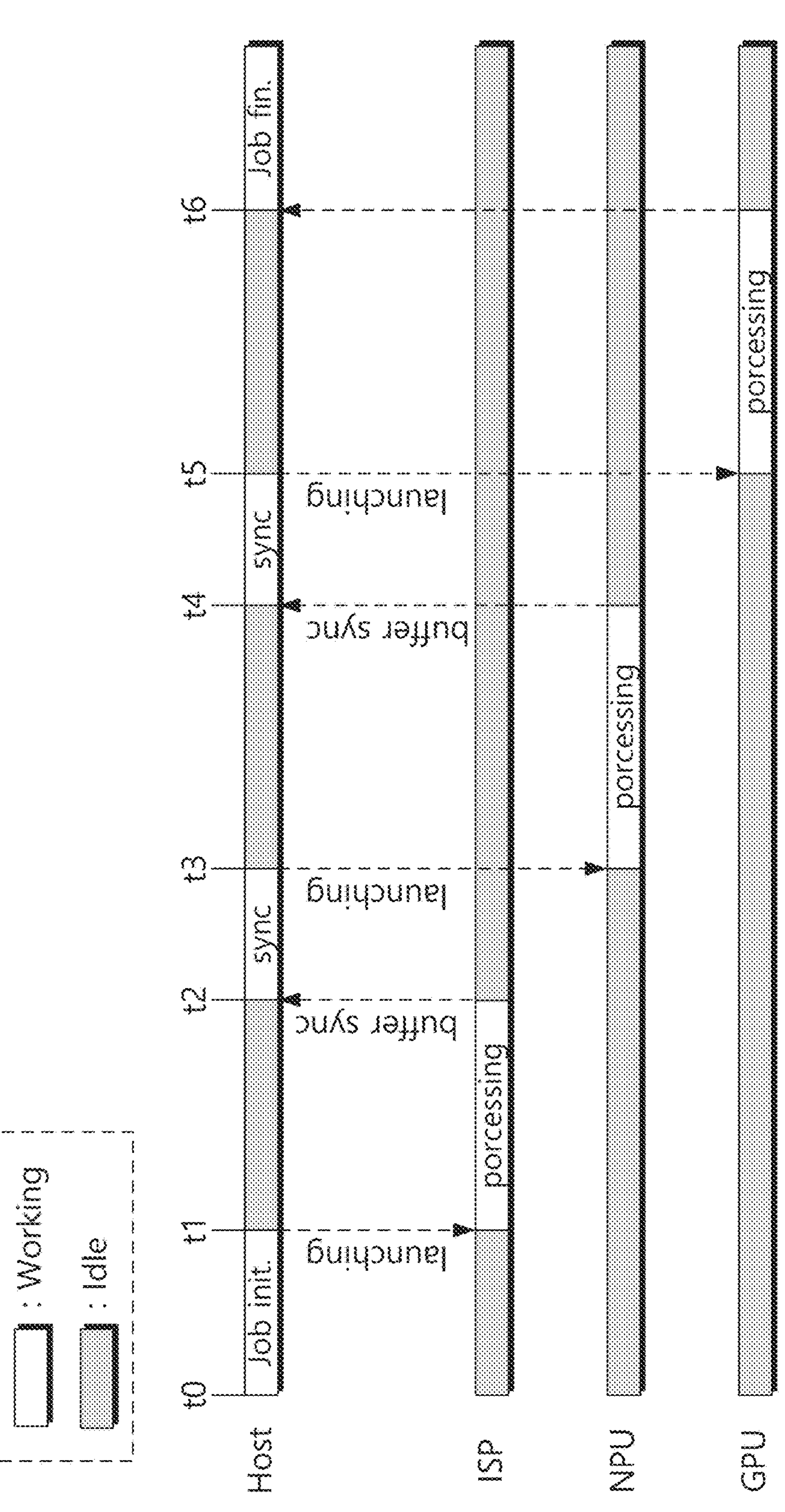
FIG. 13 is a timing diagram showing an example of a general processing process when the HiveSync monitor does not support synchronization of buffer memory according to some implementations.

FIG. 13 is a timing diagram showing an example of a general processing process when the HiveSync monitor does not support synchronization of buffer memory according to some implementations. In FIG. 13, when there is no synchronization of the buffer memory 2500 by the HiveSync monitor 2400, the task launching by the host 2100 is also transmitted serially.

The host 2100 (see FIG. 12) initializes the task at time t0. And when task initialization is completed, the host 2100 will transmit the task launch to the ISP 2200 at time t1. Then, the ISP 2200 processes the data according to the request of the host 2100 and begins storing it in the buffer memory 2500 at time t2.

At time t3, when storage or synchronization to the buffer memory 2500 by the ISP 2200 is completed, the host 2100 transmits a job launch to the NPU 2300. At time t3, the NPU 2300 reads data stored in the buffer memory 2500 in response to a request from the host 2100 and performs processing such as neural network calculation. At time t4, the NPU 2300 starts buffer synchronization to store processed data in the buffer memory 2500. And at time t5, buffer synchronization by the NPU 2300 is completed.

At t5, when buffer synchronization by the NPU 2300 is completed, the host 2100 transmits the task launch to the GPU 2350. At time t5, the GPU 2350 reads data synchronized to the buffer memory 2500 in response to a request from the host 2100 and performs processing. At time t6, the GPU 2350 stores the processed data in the buffer memory 2500. When data storage in the buffer memory 2500 is completed, the task is completed.

If there is no HiveSync monitor 2400 that performs synchronization of the buffer memory at a fine level using the ready bit of the present invention, the host 2100 has no choice but to sequentially transmit job launching according to the data processing status of each of the ISP 2200, NPU 2300, and GPU 2350. This causes low processing performance and reduced power efficiency.

FIG. 14 is a timing diagram showing an example of a host's task launching process when using a HiveSync monitor according to some implementations. In FIG. 14, when synchronization of the buffer memory 2500 by the HiveSync monitor 2400 is supported, job launching by the host 2100 can be delivered in parallel.

The host 2100 (see FIG. 12) initializes the task at time TO. And when job initialization is completed, the host 2100 will simultaneously transmit job launching to the ISP 2200, NPU 2300, and GPU 2350 at time T1. Then, the ISP 2200, NPU 2300, and GPU 2350 can start the assigned tasks simultaneously. However, at time T1, the NPU 2300 and GPU 2350 must use data generated by the ISP 2200, so they must wait until the buffer memory 2500 is synchronized. Accordingly, at time T1, only the ISP 2200 will begin processing data. Then, the NPU 2300 and GPU 2350 wait until the ready bit changes to the ready state after transmitting a read request for the ready bit to the HiveSync monitor 2400. If the required unit of data is synchronized to the buffer memory 2500 by the ISP 2200, the HiveSync monitor 2400 will transmit an interrupt to the NPU 2300 and GPU 2350.

At time T2, the interrupt is transmitted from the HiveSync monitor 2400 to the NPU 2300, and the NPU 2300 begins reading and processing data loaded into the buffer memory 2500. And at time T3, the interrupt is transmitted from the HiveSync monitor 2400 to the GPU 2400, and the GPU 2400 begins reading and processing data loaded into the buffer memory 2500.

In this way, the two consumers NPU 2300 and GPU 2350 can read and process data loaded into the buffer memory 2500 by the producer (i.e., ISP) until times T4, T5, T6, and T7. Accordingly, the task can be completed in a relatively short period of time, T8. At this time, each of the ISP 2200, NPU 2300, and GPU 2350 can perform synchronization the buffer memory 2500 using ready bits corresponding to fine unit data (e.g., 64-bytes) of the HiveSync monitor 2400. Accordingly, two consumers NPU 2300 and GPU 2350 can access data prepared in fine units in the buffer memory 2500 and perform parallel or pipeline processing.

The producer (ISP) and consumer (NPU, GPU) can provide high processing performance through the HiveSync monitor 2400, which synchronizes the fine unit buffer memory 2500 using the ready bit of the present invention. That is, during pipeline processing, the producer (ISP) and consumer (NPU, GPU) can load and read synchronized data from the buffer memory 2500 without the intervention of the host 2100. In addition, due to the high-speed processing, power efficiency can be improved in the system-on-a-chip 2000.

While this disclosure contains many specific implementation details, these should not be construed as limitations on the scope of what may be claimed, equivalents thereof, as well as claims to be described later. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

In addition to the above-described implementations, the subject matter of the present disclosure may encompass additional design changes or variations. In addition, the subject matter of the present disclosure will include techniques that can be modified and implemented using the implementations.

What is claimed is:

1. A system-on-chip (SoC) comprising:

a host comprising at least one processing unit configured to generate a job launching;

a buffer memory;

a producer configured to generate data in response to the job launching and store the generated data in the buffer memory;

a consumer configured to read and process the data from the buffer memory in response to the job launching; and a HiveSync monitor configured to (i) subdivide memory areas of the buffer memory into a plurality of fine units, and (ii) exchange with the producer and the consumer, at least one ready bit indicating a readiness state of data stored in at least one fine unit of the plurality of fine units of the buffer memory, wherein the HiveSync monitor device comprises:

a static random access memory (SRAM) configured to store and update a readiness table that includes the at least one ready bit for a physical address of the at least one fine unit; and circuitry configured to manage the readiness table according to an access request from the producer or the consumer, wherein the readiness table arranges the at least one ready bit in a cache-line format.

2. The SoC of claim 1, wherein the at least one ready bit is provided as 1-bit per 64-bytes of the data.

3. The SoC of claim 1, wherein the circuitry is further configured to:

determine a validity of the physical address using tag of the physical address;

output or wait for the at least one ready bit according to a value of the at least one ready bit when receiving a read request from the consumer;

write the value of the at least one ready bit according to a request from the producer or the consumer; and back up or write back the readiness table to the buffer memory.

4. The SoC of claim 1, wherein the physical address includes a HiveSync attribute bit indicating whether the HiveSync monitor is subject to ready bit management.

5. The SoC of claim 4, wherein, when the HiveSync attribute bit is logic '1', the physical address is managed as the readiness table in the HiveSync monitor.

6. The SoC of claim 1, wherein the consumer includes at least two processors that read the data from the buffer memory and process the read data.

7. The SoC of claim 5, wherein the at least two processors read the data from the buffer memory using the HiveSync monitor without intervention of the host after the job launching.

8. A method of synchronizing a buffer memory of system-on-chip (SoC), comprising:

writing, by a producer, data into a buffer memory;

issuing, by the producer, a request to write a ready bit for the data to a HiveSync monitor; and issuing, by a consumer, a read request for the ready bit to the HiveSync monitor, wherein, when the ready bit indicates a ready state, the consumer issues a read request for the data to the buffer memory, wherein, when the ready bit indicates an unready state, the consumer issues an interrupt request to the HiveSync monitor, and the HiveSync monitor transmits an interrupt to the consumer in response to the interrupt request.

9. The method of claim 8, wherein the ready bit is allocated as 1 bit per 64-byte of the data stored in the buffer memory.

10. The method of claim 8, further comprising issuing, by the consumer, a read request for the ready bit to the HiveSync monitor in response to the interrupt.

11. The method of claim 8, wherein the ready bit consists of multi-bits indicating three or more readiness states.

12. The method of claim 11, wherein the readiness states include a start state, number of consumers for the data, a discard state, and an end state.

13. A system-on-a-chip (SoC) comprising:

a host comprising at least one processing unit configured to generate a job launching;

a buffer memory;

a first processor configured to generate data in response to the job launching and store the generated data in the buffer memory;

a second processor configured to read and process the data from the buffer memory in response to the job launching;

a third processor configured to read and process the data from the buffer memory in response to the job launching;

a HiveSync monitor configured to exchange ready bit indicating a readiness state of the data in the buffer memory, the first processor, the second processor, and the third processor; and a system interconnector configured to provide a communication channel for each of the host, the buffer memory, the first processor, the second processor, the third processor, and the HiveSync monitor, wherein the ready bit is allocated as 1 bit per specific size unit of the data stored in the buffer memory, the HiveSync monitor is configured to establish a readiness table that manages the ready bit according to requests from the first processor, the second processor, and the third processor, and based on the ready bit of the data requested by the second processor or the third processor transitioning from logic ‘0’ to logic ‘1’, the HiveSync monitor is configured to generate and send an interrupt to the second processor or the third processor.

14. The SoC of claim 13, wherein the specific size corresponds to 32-bytes or 64-bytes.

* * * * *